United States Patent
Sano (10) Patent No.: US 9,246,193 B2
(45) Date of Patent: *Jan. 26, 2016

(54) ALL-SOLID-STATE LITHIUM-ION SECONDARY BATTERY AND PRODUCTION METHOD THEREOF

(75) Inventor: Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 869 days.

This patent is subject to a terminal disclaimer.

(21) Appl. No.: 12/054,035

(22) Filed: Mar. 24, 2008

(65) Prior Publication Data

US 2008/0311480 A1     Dec. 18, 2008

(30) Foreign Application Priority Data

Mar. 29, 2007    (JP) ................................. 2007-087967

(51) Int. Cl.

| | |
|---|---|
| *H01M 10/0562* | (2010.01) |
| *H01M 10/052* | (2010.01) |
| *H01M 10/0585* | (2010.01) |
| *H01M 4/13* | (2010.01) |
| *H01M 4/139* | (2010.01) |
| *H01M 4/36* | (2006.01) |
| *H01M 10/0525* | (2010.01) |
| *B32B 37/06* | (2006.01) |
| *B32B 37/24* | (2006.01) |
| *H01M 4/131* | (2010.01) |
| *H01M 4/133* | (2010.01) |

(52) U.S. Cl.
CPC ........... *H01M 10/0585* (2013.01); *B32B 37/06* (2013.01); *B32B 37/24* (2013.01); *H01M 4/13* (2013.01); *H01M 4/139* (2013.01); *H01M 4/364* (2013.01); *H01M 10/0525* (2013.01); *H01M 10/0562* (2013.01); *B32B 2037/243* (2013.01); *B32B 2260/04* (2013.01); *B32B 2305/80* (2013.01); *B32B 2307/202* (2013.01); *B32B 2309/02* (2013.01); *B32B 2309/60* (2013.01); *B32B 2315/02* (2013.01); *B32B 2457/10* (2013.01); *H01M 4/131* (2013.01); *H01M 4/133* (2013.01); *H01M 2300/0068* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| | | |
|---|---|---|
| 3,619,428 A | 11/1971 | David |
| 3,969,139 A | 7/1976 | Lai |
| 4,011,374 A | 3/1977 | Kaun |

(Continued)

FOREIGN PATENT DOCUMENTS

| | | |
|---|---|---|
| CN | 1505198 A | 6/2004 |
| CN | 1574428 A | 2/2005 |

(Continued)

OTHER PUBLICATIONS

Machine translation of JP 2001-126758, Osaki et al., May 11, 2001.*

(Continued)

*Primary Examiner* — Yoshitoshi Takeuchi
(74) *Attorney, Agent, or Firm* — Oliff PLC (57) ABSTRACT

An all-solid-state lithium-ion secondary battery has an anode, a cathode, a solid electrolyte layer disposed between the anode and the cathode, and at least one of a first intermediate layer disposed between the anode and the solid electrolyte layer, and a second intermediate layer disposed between the cathode and the solid electrolyte layer.

10 Claims, 3 Drawing Sheets

(56) References Cited

U.S. PATENT DOCUMENTS

| | | | |
|---|---|---|---|
| 4,052,336 A | 10/1977 | van Montfoort et al. |
| 4,224,392 A | 9/1980 | Oswin |
| 4,233,378 A | 11/1980 | Joo' et al. |
| 4,482,641 A | 11/1984 | Wennerberg |
| 4,569,924 A | 2/1986 | Ozin et al. |
| 4,656,153 A | 4/1987 | Wennerberg |
| 4,970,189 A | 11/1990 | Tachibana |
| 5,462,821 A | 10/1995 | Onoue et al. |
| 5,938,837 A | 8/1999 | Hanawa et al. |
| 6,203,949 B1 | 3/2001 | Ehrlich |
| 6,335,002 B1 | 1/2002 | Kogoi et al. |
| 7,083,876 B2 | 8/2006 | Honbo et al. |
| 7,517,606 B2 | 4/2009 | Kodas et al. |
| 7,618,747 B2 | 11/2009 | Audemer et al. |
| 7,691,782 B2 | 4/2010 | Tanaka |
| 7,710,073 B2 | 5/2010 | Yamauchi et al. |
| 7,923,154 B2 | 4/2011 | Audemer et al. |
| 2001/0020319 A1 | 9/2001 | Farahmandi et al. |
| 2002/0126439 A1 | 9/2002 | Sato et al. |
| 2003/0086860 A1 | 5/2003 | Uehara et al. |
| 2003/0118897 A1* | 6/2003 | Mino et al. ............ 429/149 |
| 2004/0004208 A1 | 1/2004 | Sakata et al. |
| 2004/0047798 A1 | 3/2004 | Oh et al. |
| 2004/0106046 A1 | 6/2004 | Inda |
| 2004/0191632 A1 | 9/2004 | Kelley et al. |
| 2004/0234859 A1 | 11/2004 | Lee et al. |
| 2005/0019649 A1 | 1/2005 | Kakutani et al. |
| 2005/0181268 A1 | 8/2005 | Ohya et al. |
| 2006/0024583 A1 | 2/2006 | Singh et al. |
| 2006/0105242 A1 | 5/2006 | Sato et al. |
| 2006/0140846 A1 | 6/2006 | Leis et al. |
| 2006/0228631 A1* | 10/2006 | Miura et al. ............ 429/232 |
| 2006/0234130 A1 | 10/2006 | Inda |
| 2007/0015336 A1 | 1/2007 | Farahmandi et al. |
| 2008/0237536 A1 | 10/2008 | Sano |
| 2008/0241665 A1 | 10/2008 | Sano |
| 2009/0023066 A1 | 1/2009 | Kojima et al. |
| 2009/0061312 A1 | 3/2009 | Zhamu et al. |
| 2009/0274832 A1 | 11/2009 | Inda |
| 2010/0142122 A1 | 6/2010 | Tanaka |
| 2011/0212365 A1 | 9/2011 | Audemer et al. |

FOREIGN PATENT DOCUMENTS

| | | |
|---|---|---|
| CN | 1613162 A | 5/2005 |
| JP | A-04-310512 | 11/1992 |
| JP | A-05-299101 | 11/1993 |
| JP | A-10-297912 | 11/1998 |
| JP | A-11-054155 | 2/1999 |
| JP | A-11-185733 | 7/1999 |
| JP | A-11-214034 | 8/1999 |
| JP | A-2000-138073 | 5/2000 |
| JP | A-2001-023616 | 1/2001 |
| JP | A-2001-126758 | 5/2001 |
| JP | A-2001-143697 | 5/2001 |
| JP | A-2001-332254 | 11/2001 |
| JP | A-2002-270170 | 9/2002 |
| JP | A-2003-187876 | 7/2003 |
| JP | A-2004-175660 | 6/2004 |
| JP | A-2004-183078 | 7/2004 |
| JP | A-2004-311428 | 11/2004 |
| JP | A-2005-530676 | 10/2005 |
| JP | A-2006-056750 | 3/2006 |
| WO | WO 97/31738 A1 | 9/1997 |
| WO | WO 2005/076390 A2 | 8/2005 |
| WO | WO 2006/118120 A1 | 9/2006 |

OTHER PUBLICATIONS

Machine translation of JP 2006-056750, Takasu et al., Mar. 2, 2006.*
Mar. 16, 2009 Office Action issued in U.S. Appl. No. 12/052,207.
Sep. 22, 2009 Office Action issued in U.S. Appl. No. 12/052,207.
May 19, 2010 Office Action issued in U.S. Appl. No. 12/052,207.
Oct. 21, 2010 Office Action issued in U.S. Appl. No. 12/052,207.
English Translation of Chinese Office Action dated Jan. 26, 2011 in Chinese Patent Application No. 200810088541.9.
Sep. 1, 2011 Office Action issued in U.S. Appl. No. 12/053,997.
Nov. 8, 2011 Office Action issued in U.S. Appl. No. 12/052,207.
Feb. 28, 2012 Office Action issued in U.S. Appl. No. 12/052,207.
May 11, 2011 Office Action issued in U.S. Appl. No. 12/052,207.
Jul. 26, 2012 Office Action issued in U.S. Appl. No. 12/052,207.
Apr. 12, 2013 Office Action issued in U.S. Appl. No. 12/053,997.
Apr. 24, 2013 Office Action issued in U.S. Appl. No. 12/052,207.
Final Rejection issued Jan. 11, 2013 in U.S. Appl. No. 12/052,207.
Dec. 2, 2013 Office Action issued in U.S. Appl. No. 12/052,207.
Jun. 19, 2014 Office Action issued in U.S. Appl. No. 12/052,207.
Feb. 27, 2014 Office Action issued in U.S. Appl. No. 12/053,997.
Jul. 7, 2015 Office Action issued in U.S. Appl. No. 12/053,997.
Sep. 17, 2014 Office Action issued in U.S. Appl. No. 12/053,997.

* cited by examiner

ALL-SOLID-STATE LITHIUM-ION SECONDARY BATTERY AND PRODUCTION METHOD THEREOF

BACKGROUND OF THE INVENTION

1. Field of the Invention

The present invention relates to an all-solid-state lithium-ion secondary battery and a production method thereof.

2. Related Background Art

A lithium-ion secondary battery is composed mainly of a cathode, an anode, and an electrolyte layer disposed between the cathode and the anode (e.g., a layer consisting of a liquid electrolyte or a solid electrolyte). In the conventional secondary batteries, the cathode and/or the anode is made using a coating solution (e.g., a solution of a slurry form or a paste form) for formation of the electrode containing an active material for the corresponding electrode, a binder, and a conductive aid.

A variety of research and development has been conducted on the lithium-ion secondary batteries toward further improvement in battery characteristics so as to adapt for future development of portable equipment (e.g., achievement of a higher capacity, improvement in safety, increase in energy density, and so on). Particularly, as to the lithium-ion secondary batteries, an attempt to realize a configuration of a so-called "all-solid-state battery" employing an electrolyte layer consisting of a solid electrolyte is being made from the viewpoints of achieving weight reduction of the battery, increase in energy density, and improvement in safety.

However, the solid electrolyte provides high safety on one hand, but has a problem that it is inferior in rate characteristic to the electrolyte solution because of the smaller number of ion-conduction paths, on the other hand. For remedying this problem, there are the following proposals of production of the all-solid-state battery: a method of forming the solid electrolyte layer by vacuum evaporation (see, for example, Japanese Patent Application Laid-open No. 2004-183078); a method of impregnating a solid electrolyte and an electrode with a polymer solid electrolyte and polymerizing it (see, for example, Japanese Patent Application Laid-open No. 2000-138073), and so on.

SUMMARY OF THE INVENTION

However, the battery obtained by the method of depositing the solid electrolyte layer by vacuum evaporation has an effective surface area of the interface between the electrode and the electrolyte too small to realize a large electric current, and the high-rate discharge characteristic thereof is still insufficient. The battery obtained by the method of impregnating and polymerizing the polymer solid electrolyte is advantageous in formation of the interface between the electrode active material and the electrolyte but has the ion conductivity lower than that with inorganic solid electrolytes, and the high-rate discharge characteristic thereof is still insufficient. In addition, these conventional batteries are still insufficient in their cycle characteristic, too.

The present invention has been accomplished in view of the problems in the conventional technologies and an object of the present invention is to provide an all-solid-state lithium-ion secondary battery with excellent high-rate discharge characteristic and with excellent cycle characteristic, and a production method thereof.

In order to achieve the above object, the present invention provides a production method of an all-solid-state lithium-ion secondary battery comprising: a primary sintered body forming step of forming a primary sintered body of anode, a primary sintered body of cathode, and a primary sintered body of solid electrolyte layer; a laminate forming step of disposing the primary sintered body of solid electrolyte layer between the primary sintered body of anode and the primary sintered body of cathode, and disposing at least one of an undried first precursor layer formed by application of a first sol intermediate layer precursor on a surface of the primary sintered body of anode nearer to the primary sintered body of solid electrolyte layer or on a surface of the primary sintered body of solid electrolyte layer nearer to the primary sintered body of anode, and an undried second precursor layer formed by application of a second sol intermediate layer precursor on a surface of the primary sintered body of cathode nearer to the primary sintered body of solid electrolyte layer or on a surface of the primary sintered body of solid electrolyte layer nearer to the primary sintered body of cathode, thereby forming a laminate; and a firing step of firing the laminate to obtain a sintered body comprising an anode resulting from refiring of the primary sintered body of anode, a cathode resulting from refiring of the primary sintered body of cathode, and a solid electrolyte layer disposed between the anode and the cathode and resulting from refiring of the primary sintered body of solid electrolyte layer, and comprising at least one of a first intermediate layer disposed between the anode and the solid electrolyte layer and resulting from firing of the first precursor layer, and a second intermediate layer disposed between the cathode and the solid electrolyte layer and resulting from firing of the second precursor layer.

Since the all-solid-state lithium-ion secondary battery by the above-described production method is obtained by laminating the anode, the solid electrolyte layer, and the cathode through the first precursor layer and/or the second precursor layer in an undried state and thereafter firing them, joining is enhanced at the interface between the anode and the solid electrolyte layer and/or between the cathode and the solid electrolyte layer because of the existence of the intermediate layer, so as to enhance ion conductivity, and the effective surface area is substantially largely increased. For this reason, the all-solid-state lithium-ion secondary battery by the above production method is obtained with excellent high-rate discharge characteristic and excellent cycle characteristic.

In the laminate forming step of the production method of the all-solid-state lithium-ion secondary battery according to the present invention, preferably, the first intermediate layer contains a constituent material of the anode and/or a constituent material of the solid electrolyte layer and the second intermediate layer contains a constituent material of the cathode and/or a constituent material of the solid electrolyte layer. This enhances compatibility between layers to achieve excellent joining between the anode and the solid electrolyte layer and/or between the cathode and the solid electrolyte layer in the resulting all-solid-state lithium-ion secondary battery, whereby the secondary battery is obtained with better high-rate discharge characteristic and better cycle characteristic.

In the production method of the all-solid-state lithium-ion secondary battery according to the present invention, preferably, the laminate forming step comprises performing vacuum impregnation after the application of the first sol intermediate layer precursor and/or the second sol intermediate layer precursor. This makes the joining better through the intermediate layer between the anode and the solid electrolyte layer and/or between the cathode and the solid electrolyte layer in the resulting all-solid-state lithium-ion secondary battery, whereby the secondary battery is obtained with better high-rate discharge characteristic and better cycle characteristic.

In the production method of the all-solid-state lithium-ion secondary battery according to the present invention, preferably, the first sol intermediate layer precursor and/or the second sol intermediate layer precursor contains at least one element selected from the group consisting of Ti, Al, La, Ge, Si, Ce, Ga, In, P, and S. This allows us to obtain the all-solid-state lithium-ion secondary battery with a high capacity and with better high-rate discharge characteristic and cycle characteristic.

In the production method of the all-solid-state lithium-ion secondary battery according to the present invention, preferably, the primary sintered body of anode, the primary sintered body of cathode, and the primary sintered body of solid electrolyte layer are obtained by firing a sol anode precursor, a sol cathode precursor, and a sol solid electrolyte layer precursor, respectively. When the primary sintered bodies of anode, cathode, and solid electrolyte layer are formed by firing their respective sol precursors, ion conductivity is more enhanced between the electrode and the solid electrolyte layer joined through the first intermediate layer or the second intermediate layer obtained by applying and firing the sol precursor similarly, whereby the resulting all-solid-state lithium-ion secondary battery comes to have more adequate high-rate discharge characteristic and cycle characteristic.

In the production method of the all-solid-state lithium-ion secondary battery according to the present invention, preferably, the sol solid electrolyte layer precursor contains at least one element selected from the group consisting of Ti, Al, La, Ge, Si, Ce, Ga, In, P, and S. When the sol solid electrolyte layer precursor to form the solid electrolyte layer contains one of these elements, the all-solid-state lithium-ion secondary battery is obtained with the solid electrolyte layer having higher lithium-ion conductivity.

In the production method of the all-solid-state lithium-ion secondary battery according to the present invention, preferably, the sol anode precursor contains an ion of at least one metal selected from the group consisting of Sn, Si, Al, Ge, Sb, Ag, Ga, In, Fe, Co, Ni, Ti, Mn, Ca, Ba, La, Zr, Ce, Cu, and Zn; a hydroxy acid; and a glycol. When the sol anode precursor to form the anode contains one of these metal ions, the hydroxy acid, and the glycol, the resulting all-solid-state lithium-ion secondary battery is obtained as a battery with higher output/input and with a higher capacity.

In the production method of the all-solid-state lithium-ion secondary battery according to the present invention, preferably, the sol cathode precursor contains an ion of at least one transition metal selected from the group consisting of Co, Ni, Mn, and Fe. When the sol cathode precursor to form the cathode contains one of these transition metal ions, the resulting all-solid-state lithium-ion secondary battery is obtained as a battery with higher output/input and with a higher capacity.

In the production method of the all-solid-state lithium-ion secondary battery according to the present invention, preferably, the first sol intermediate layer precursor and/or the second sol intermediate layer precursor contains a constituent material of the sol solid electrolyte layer precursor. This allows us to obtain the all-solid-state lithium-ion secondary battery with a high capacity and with better high-rate discharge characteristic and cycle characteristic.

Furthermore, in the production method of the all-solid-state lithium-ion secondary battery according to the present invention, preferably, the firing step comprises firing the laminate under a condition of firing temperature of 500° C. or more in the presence of oxygen. When the firing is carried out under this condition, the resulting all-solid-state lithium-ion secondary battery is integrated in an adequately close fit through the intermediate layer between the anode and the solid electrolyte and/or between the cathode and the solid electrolyte layer, whereby the all-solid-state lithium-ion secondary battery is obtained as one with higher ion conductivity.

The present invention also provides an all-solid-state lithium-ion secondary battery comprising: an anode; a cathode; a solid electrolyte layer disposed between the anode and the cathode; and at least one of a first intermediate layer disposed between the anode and the solid electrolyte layer, and a second intermediate layer disposed between the cathode and the solid electrolyte layer.

Since this all-solid-state lithium-ion secondary battery comprises the first intermediate layer and/or the second intermediate layer, joining is enhanced at the interface between the anode and the solid electrolyte layer and/or between the cathode and the solid electrolyte layer, whereby the effective surface area is substantially largely increased. For this reason, the all-solid-state lithium-ion secondary battery is obtained with excellent high-rate discharge characteristic and excellent cycle characteristic.

In the all-solid-state lithium-ion secondary battery of the present invention, preferably, the first intermediate layer contains a constituent material of the anode and/or a constituent material of the solid electrolyte layer and the second intermediate layer contains a constituent material of the cathode and/or a constituent material of the solid electrolyte layer. In this configuration, the all-solid-state lithium-ion secondary battery is obtained with a high capacity and with better high-rate discharge characteristic and cycle characteristic.

In the all-solid-state lithium-ion secondary battery of the present invention, preferably, the first intermediate layer and/or the second intermediate layer contains a constituent material of the solid electrolyte layer. In this configuration, the all-solid-state lithium-ion secondary battery is obtained as one with a higher capacity and with better high-rate discharge characteristic and cycle characteristic.

Furthermore, the all-solid-state lithium-ion secondary battery of the present invention is preferably one obtained by the production method of the all-solid-state lithium-ion secondary battery of the present invention described above. When the all-solid-state lithium-ion secondary battery is one obtained by the aforementioned production method of the present invention, joining is enhanced at the interface between the anode and the solid electrolyte layer and/or between the cathode and the solid electrolyte layer because of the existence of the intermediate layer, whereby the effective surface area is substantially largely increased. For this reason, the all-solid-state lithium-ion secondary battery is obtained with excellent high-rate discharge characteristic and excellent cycle characteristic.

The present invention successfully provides the all-solid-state lithium-ion secondary battery with excellent high-rate discharge characteristic and excellent cycle characteristic, and the production method thereof.

DESCRIPTION OF THE PREFERRED EMBODIMENTS

The preferred embodiments of the present invention will be described below in detail with reference to the drawings. Identical or equivalent portions will be denoted by the same reference symbols in the drawings, without redundant description. The vertical, horizontal, and other positional relations are based on the positional relations shown in the drawings, unless otherwise stated in particular. Furthermore, the dimensional ratios in the drawings do not always have to be limited to the illustrated ratios.

Figure 1:
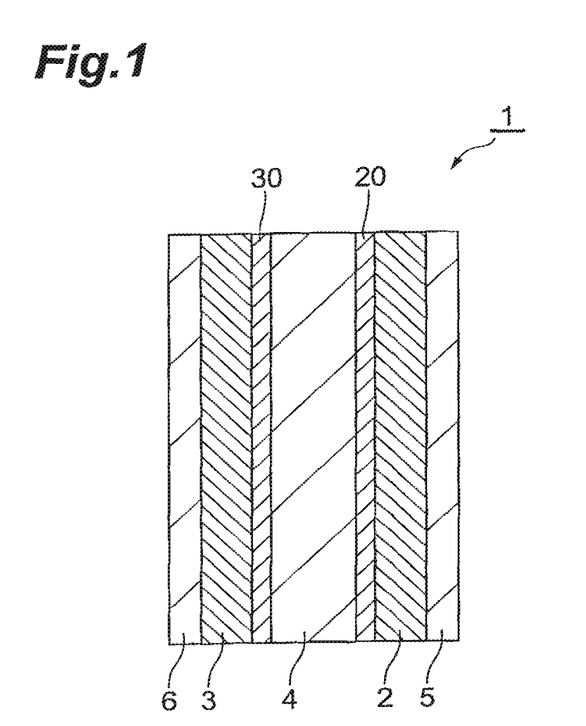
FIG. 1 is a schematic sectional view showing a basic configuration of a preferred embodiment of the all-solid-state lithium-ion secondary battery of the present invention.

FIG. 1 is a schematic sectional view showing a basic configuration of a preferred embodiment of the all-solid-state lithium-ion secondary battery of the present invention. The all-solid-state lithium-ion secondary battery 1 shown in FIG. 1 is composed mainly of an anode 2 and a cathode 3, and a solid electrolyte layer 4 disposed between the anode 2 and the cathode 3. The "anode" 2 and "cathode" 3 herein are based on the polarities during discharge of the lithium-ion secondary battery 1, for convenience' sake of description. Therefore, the "anode" 2 serves as a "cathode" and the "cathode" 3 as an "anode" during charge.

In the secondary battery 1, a filmlike (platelike or lamellar) current collector (anode collector) 5 is provided on a surface of the anode 2 on the opposite side to the solid electrolyte layer 4, and a filmlike (platelike or lamellar) current collector (cathode collector) 6 is provided on a surface of the cathode 3 on the opposite side to the solid electrolyte layer 4. There are no particular restrictions on the shape of the anode 2 and cathode 3, and they may be formed, for example, in the thin film shape (lamellar shape) as illustrated.

In the secondary battery 1, a first intermediate layer 20 is formed between the anode 2 and the solid electrolyte layer 4. The first intermediate layer 20 preferably contains a constituent material of the anode 2 and/or a constituent material of the solid electrolyte layer 4. A second intermediate layer 30 is formed between the cathode 3 and the solid electrolyte layer 4. The second intermediate layer 30 preferably contains a constituent material of the cathode 3 and/or a constituent material of the solid electrolyte layer. These first intermediate layer 20 and second intermediate layer 30 may be impregnated in part into the electrode 2, 3 and/or into the solid electrolyte layer 4 in contact therewith.

The anode 2 may be any material containing an anode active material capable of implementing reversible progress of occlusion and release of lithium ions, desorption and insertion of lithium ions, or doping and dedoping with lithium ions and counter anions (e.g., $ClO_4^-$) to the lithium ions, and is preferably one containing as an anode active material an oxide of at least one metal selected from the group consisting of Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V, and Zn.

The anode 2 is also preferably one containing as an anode active material a composite material in which at least one of the metal selected from the group, an alloy of two or more metals selected from the group, and oxides thereof is supported in pores of a porous carbon material. When the anode 2 contains the foregoing composite material, the all-solid-state lithium-ion secondary battery can be formed with a high capacity and with better high-rate discharge characteristic and cycle characteristic.

In the foregoing composite material, the average pore size of the porous carbon material is preferably not more than 5 nm. The average primary particle size of the metal or the alloy thereof, or the oxides thereof supported in the pores of the porous carbon material is preferably not less than 10 nm nor more than 500 nm. These can increase rates of occlusion and release of lithium ions. This average primary particle size can be obtained by measuring distances between grain boundaries crossing an arbitrary straight line in a TEM photograph as primary particle sizes at ten points and calculating an average thereof.

Furthermore, the anode 2 may contain graphite, a carbonaceous material, lithium titanate, or the like. A sol precursor of lithium titanate may be used as an anode precursor.

The anode 2 may be one formed by the well-known solid-phase growth method, but is preferably one formed using a sol anode precursor for formation of the anode 2. This sol anode precursor is preferably one containing an ion of at least one metal selected from the group consisting of Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V, and Zn. This sol anode precursor is fired in the presence of oxygen to form the anode 2 containing an oxide of the metal. In this case, the anode 2 may also be formed by adding particles of a metal oxide or the like containing the foregoing metal, in the sol anode precursor and firing it.

When the anode 2 is one containing a composite material in which at least one of the metal from the group, the alloy of two or more metals from the group, and the oxides thereof is supported in pores of a porous carbon material, the sol anode precursor for formation of the anode 2 is preferably one containing an ion of at least one metal selected from the group consisting of Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V, and Zn; a hydroxy acid; and a glycol. When the sol anode precursor of this kind is fired in an inert atmosphere such as nitrogen or argon, polmerization of a metal complex proceeds by dehydrating condensation between the metal complex with the foregoing metal as a center metal and the hydroxy acid as ligands, and the glycol, and the polymerized metal complex is further thermally decomposed, thereby forming the foregoing composite material in which the metal and/or the alloy is nanodispersed in a carbon matrix. If the composite material is further fired thereafter in the presence of oxygen in an amount so small as to maintain the porous carbon material, the composite material is obtained in a structure in which the oxide of the metal and/or the alloy is nanodispersed in the carbon matrix.

The firing of the sol anode precursor for formation of the composite material is preferably carried out at two stages of temperatures. Namely, it is preferable to perform the first heating at a temperature to polymerize the metal complex and thereafter perform the second heating at a temperature to thermally decompose the polymerized metal complex. The temperature of the first heating is preferably 100-250° C. and the temperature of the second heating is preferably a temperature 20-30° C. lower than the melting point of the metal. When the firing is carried out at two stages of temperatures as described above, the metal complex is first fully polymerized and thereafter thermally decomposed, whereby the metal, the alloy, or the oxide of the metal or the alloy can be supported in a highly dispersed state in a finer carbon matrix, which can further improve the capacity, high-rate discharge characteristic, and cycle characteristic of the secondary battery 1.

The ion of the aforementioned metal can be used, for example, in the form of nitrate, chloride, an organic acid salt, or the like of the metal. The hydroxy acid can be, for example, citric acid, tartaric acid, citramalic acid, isocitric acid, leucine acid, mevalonic acid, pantoic acid, ricinoleic acid, ricinelaidic acid, cerebronic acid, or the like. The glycol can be, for example, ethylene glycol, propylene glycol, diethylene glycol, or the like.

Furthermore, the sol anode precursor may contain an organic solvent such as alcohol, an acid or an alkali acting as a stabilizer or a catalyst for the sol, a polymer for adjustment of viscosity of the sol, and so on. The alcohol can be methanol, ethanol, propanol, butanol, or the like. The acid can be acetic acid, hydrochloric acid, or the like. The polymer can be a cellulose polymer such as methylcellulose, ethylcellulose, or hydroxypropyl methylcellulose, or a polymer usually used as a thickener, e.g., polyacrylic acid, algin acid, polyvinyl alcohol, or polyvinylpyrrolidone.

There are no particular restrictions on the thickness of the anode 2, but from the viewpoint of achieving high-rate characteristic, the thickness of the anode 2 is preferably not less than 0.1 μm nor more than 100 μm and more preferably not less than 0.5 μm nor more than 10 μm.

The cathode 3 may be any cathode containing a cathode active material capable of implementing reversible progress of occlusion and release of lithium ions, desorption and insertion of lithium ions, or doping and dedoping with lithium ions, and is preferably one containing as a cathode active material, an oxide or an olivine-type phosphor compound of at least one transition metal selected from the group consisting of Co, Ni, Mn, and Fe, or a silicon compound or the like. Furthermore, the cathode 3 may contain a sulfide, a carbonaceous material, or the like.

The cathode 3 may be one formed by the well-known solid-phase growth method, but is preferably one formed using a sol cathode precursor for formation of the cathode 3. This sol cathode precursor is preferably one containing an ion of at least one transition metal selected from the group consisting of Co, Ni, Mn, and Fe. In this case, the cathode 3 may also be formed using a material obtained by adding particles of a metal oxide or the like containing the foregoing transition metal, in the sol cathode precursor.

The ion of the foregoing transition metal can be used, for example, in the form of acetate, alkoxide, acetylacetonate, carboxylate, nitrate, oxychloride, chloride, or the like of the transition metal.

Furthermore, the sol cathode precursor may contain an organic solvent such as alcohol, an acid or an alkali acting as a stabilizer or a catalyst for the sol, a polymer for adjustment of viscosity of the sol, and so on. The alcohol can be methanol, ethanol, propanol, butanol, or the like. The acid can be acetic acid, hydrochloric acid, or the like. The polymer can be a cellulose polymer such as methylcellulose, ethylcellulose, or hydroxypropyl methylcellulose, or a polymer usually used as a thickener, e.g., polyacrylic acid, algin acid, polyvinyl alcohol, or polyvinylpyrrolidone.

There are no particular restrictions on the thickness of the cathode 3, but from the viewpoint of increase in output/input density of ion, the thickness of the cathode 3 is preferably not less than 0.1 μm nor more than 100 μm and more preferably not less than 0.3 μm nor more than 10 μm.

There are no particular restrictions on the solid electrolyte layer 4 as long as it has the conductivity of lithium ions. However, the solid electrolyte layer 4 is preferably one containing an oxide of at least one element selected from the group consisting of Ti, Al, La, Ge, Si, Ce, Ga, In, P, and S; and a lithium salt such as lithium acetate or lithium isopropoxide, or an alkali metal salt consisting primarily of lithium. The solid electrolyte layer 4 is also preferably one containing a phosphate compound represented by the general formula (1);

$$Li_{1+x}Al_xTi_{2-x}(PO_4)_3 \quad (1)$$

$(0 \leq x \leq 2)$.

Furthermore, the solid electrolyte layer 4 may contain a lithium-ion-conductive NASICON-type compound, a sulfide such as $Li_2S/P_2S_5$, a lithium-ion-conductive oxide such as $Li_{0.34}La_{0.51}TiO_{2.94}$, a phosphate compound such as LiPON, or the like.

The solid electrolyte layer 4 may be one formed by the well-known solid-phase growth method, but is preferably one formed using a sol solid electrolyte layer precursor for formation of the solid electrolyte layer 4. This sol solid electrolyte layer precursor is preferably one containing a compound containing at least one element selected from the group consisting of Ti, Al, La, Ge, Si, Ce, Ga, In, P, and S; and a lithium salt such as lithium acetate or lithium isopropoxide, or an alkali metal salt consisting primarily of lithium. Specific examples of compounds containing the above-listed elements include titanium tetra-tert-butoxide, titanium tetra-n-butoxide, aluminum butoxide, ammonium dihydrogenphosphate, and so on. In this case, the solid electrolyte layer 4 may also be formed using a material obtained by adding particles of an oxide or the like containing the foregoing element, in the sol solid electrolyte layer precursor.

Furthermore, the sol solid electrolyte layer precursor may contain an organic solvent such as alcohol, an acid or an alkali acting as a stabilizer or a catalyst for the sol, a polymer for adjustment of viscosity of the sol, and so on. The alcohol can be methanol, ethanol, propanol, butanol, or the like. The acid can be acetic acid, hydrochloric acid, or the like. The polymer can be a cellulose polymer such as methylcellulose, ethylcellulose, or hydroxypropyl methylcellulose, or a polymer usually used as a thickener, e.g., polyacrylic acid, algin acid, polyvinyl alcohol, polyvinylpyrrolidone, or the like.

There are no particular restrictions on the thickness of the solid electrolyte layer 4, but from the viewpoint of achievement of high-rate characteristic, the thickness of the solid electrolyte layer 4 is preferably not less than 0.1 μm nor more than 100 μm and more preferably not less than 0.3 μm nor more than 10 μm.

In the secondary battery 1, the anode 2, the cathode 3, and the solid electrolyte layer 4 all may be those formed from the sol solid electrolyte layer precursor, or they may include those formed by the well-known solid-phase growth method.

The first intermediate layer 20 may be a layer made using a material different from the constituent material of the anode 2 and/or the constituent material of the solid electrolyte layer 4 described above, but is preferably a layer containing the constituent material of the anode 2 and/or the constituent material of the solid electrolyte layer 4. This first intermediate layer 20 can be made using a first sol intermediate layer precursor containing the constituent material of the sol anode precursor and/or the constituent material of the sol solid electrolyte layer precursor as described above. The first sol intermediate layer precursor may have the same composition as the sol anode precursor or the same composition as the sol solid electrolyte layer precursor or may have a composition of a mixture of the constituent material of the sol anode precursor and the constituent material of the sol solid electrolyte layer precursor, or a composition further containing a constituent material except for the constituent material of the sol anode precursor and the constituent material of the sol solid electrolyte layer precursor.

The second intermediate layer 30 may be a layer made using a material different from the constituent material of the cathode 3 and/or the constituent material of the solid electrolyte layer 4 described above, but is preferably a layer containing the constituent material of the cathode 3 and/or the constituent material of the solid electrolyte layer 4. This second intermediate layer 30 can be made using a second sol intermediate layer precursor containing the constituent material of the sol cathode precursor and/or the constituent material of the sol solid electrolyte layer precursor as described above. The second sol intermediate layer precursor may have the same composition as the sol cathode precursor or the same composition as the sol solid electrolyte layer precursor, or may have a composition of a mixture of the constituent material of the sol cathode precursor and the constituent material of the sol solid electrolyte layer precursor, or a composition further containing a constituent material except for the constituent material of the sol cathode precursor and the constituent material of the sol solid electrolyte layer precursor.

Each of the first intermediate layer 20 and the second intermediate layer 30 is preferably a layer containing the constituent material of the solid electrolyte layer 4. Therefore, each of the first sot intermediate layer precursor and the second sol intermediate layer precursor is preferably one containing the constituent material of the sol solid electrolyte layer precursor. The compositions of the first sol intermediate layer precursor and the second sol intermediate layer precursor may be identical with or different from each other. For example, from the viewpoint of achieving good ion conductivity between layers, it is also preferable that the first sol intermediate layer precursor and the second sol intermediate layer precursor both have the same composition as the sol solid electrolyte layer precursor.

Since the secondary battery 1 has the first intermediate layer 20 and the second intermediate layer 30 described above, ion conductivity is drastically enhanced between the anode 2 and the solid electrolyte layer 4 and between the cathode 3 and the solid electrolyte layer 4 in the secondary battery 1, whereby excellent high-rate discharge characteristic is achieved.

The all-solid-state lithium-ion secondary battery of the present invention may be one having only one of the first intermediate layer 20 and the second intermediate layer 30. In this case, the ion conductivity is enhanced between the electrode on the side where the intermediate layer exists (anode 2 or cathode 3) and the solid electrolyte layer 4, whereby the high-rate discharge characteristic is enhanced, when compared with the case without the intermediate layer.

There are no particular restrictions on the thickness of the first intermediate layer 20 and the second intermediate layer 30, but from the viewpoint of increasing the interfacial area, the thickness is preferably not less than 0.01 μm nor more than 10 μm and more preferably not less than 0.05 μm nor more than 1 μm.

There are no particular restrictions on the constituent material of the anode collector 5 as long as it has electron conductivity. The constituent material of the anode collector 5 can be, for example, nickel, copper, or the like and is preferably nickel. Furthermore, there are no particular restrictions on the constituent material of the cathode collector 6 as long as it has electron conductivity. The constituent material of the cathode collector 6 can be, for example, nickel, aluminum, tantalum, iron, titanium, or the like and is preferably nickel, aluminum, or tantalum.

The aforementioned all-solid-state lithium-ion secondary battery of the present invention is preferably one produced by the production method of the all-solid-state lithium-ion secondary battery of the present invention described below. A preferred embodiment of the production method of the all-solid-state lithium-ion secondary battery according to the present invention will be described below using an example of producing the all-solid-state lithium-ion secondary battery 1 shown in FIG. 1.

First, the sol anode precursor is applied onto a base (e.g., a foil or sheet or the like of a polymer or metal), dried, peeled off from the base, and sintered to obtain the primary sintered body of anode. Similarly, the sol cathode precursor and the sol solid electrolyte layer precursor each are applied onto a base, dried, peeled off from the base, and sintered to obtain the primary sintered body of cathode and the primary sintered body of solid electrolyte layer, respectively (primary sintered body forming step).

Next, the primary sintered body of solid electrolyte layer is disposed between the primary sintered body of anode and the primary sintered body of cathode and they are stuck together. At this time, the first sol intermediate layer precursor is applied onto the surface of the primary sintered body of anode nearer to the primary sintered body of solid electrolyte layer or onto the surface of the primary sintered body of solid electrolyte layer nearer to the primary sintered body of anode, to form an undried first precursor layer thereon. Furthermore, the second sol intermediate layer precursor is applied onto the surface of the primary sintered body of cathode nearer to the primary sintered body of solid electrolyte layer or onto the surface of the primary sintered body of solid electrolyte layer nearer to the primary sintered body of cathode, to form an undried second precursor layer thereon. Then the primary sintered body of anode and the primary sintered body of solid electrolyte layer are stuck together through the first precursor layer and the primary sintered body of cathode and the primary sintered body of solid electrolyte layer are stuck together through the second precursor layer, thereby forming a laminate in which these are stacked (laminate forming step).

The firing of the sol precursor for obtaining the primary sintered body is preferably carried out at the temperature of 500° C. or more, more preferably at the temperature of 600-960° C., in the presence of oxygen though it depends upon the composition of each sol precursor. It is also preferable to perform drying at a lower temperature than that of the firing, prior to the firing. The drying is preferably carried out at the temperature of 80-250° C. though it depends upon a type or an amount of a solvent contained in each sol precursor. When the anode 2 is one containing a composite material in which a metal, an alloy, or an oxide of the metal or the alloy is supported in pores of a porous carbon material as described above, the firing of the sol anode precursor needs to be carried out in an inert atmosphere not containing oxygen.

In the foregoing laminate forming step, it is preferable to perform vacuum impregnation after the application of the first sol intermediate layer precursor onto the primary sintered body of anode or solid electrolyte layer and the application of the second sol intermediate layer precursor onto the primary sintered body of cathode or solid electrolyte layer. The vacuum impregnation enables the first sol intermediate layer precursor to be impregnated into the primary sintered bodies of anode and solid electrolyte layer and the second sol intermediate layer precursor to be impregnated into the primary sintered bodies of cathode and solid electrolyte layer. In the secondary battery finally obtained, therefore, the interfacial condition is enhanced between the anode and the solid electrolyte layer and between the cathode and the solid electrolyte layer to enhance the ion conductivity; it is therefore feasible to achieve better high-rate discharge characteristic and better cycle characteristic.

When the thickness of the first precursor layer 20 and the second precursor layer 30 is set adequately smaller than those of the anode 2, cathode 3, and solid electrolyte layer 4, the first and second intermediate layers finally formed are fired in a short period of time, to limit the time of solid-phase growth to a short duration, whereby crystal particle sizes therein become smaller than those in the anode 2, cathode 3, and solid electrolyte layer 4. The smaller crystal particle sizes shorten ion-conductive paths, so as to make the impedance lower than those of the conventional all-solid-state lithium-ion secondary batteries. If each of the cathode 3, anode 2, and solid electrolyte layer 4, or a laminate thereof is pressed and fired under pressure, the firing can be conducted at a lower temperature and the crystal particle sizes become smaller similarly. Good ion-conductive paths are formed in the electrode or the electrolyte press-molded at low temperature.

Next, the resultant laminate is fired (firing step). This results in refiring the primary sintered body of anode to form the anode 2, refiring the primary sintered body of cathode to form the cathode 3, and refiring the primary sintered body of solid electrolyte layer to form the solid electrolyte layer 4. It also results in firing the first precursor layer to form the first intermediate layer 20 between the anode 2 and the solid electrolyte layer 4 and firing the second precursor layer to form the second intermediate layer 30 between the cathode 3 and the solid electrolyte layer 4.

The sinter bonding through the first intermediate layer 20 between the anode 2 and the solid electrolyte 4 and the sinter bonding through the second intermediate layer 30 between the cathode 3 and the solid electrolyte 4 may be carried out separately and sequentially, or may be carried out by simultaneous firing.

The firing is carried out preferably at the temperature of 500° C. or more, more preferably at the temperature of 600-960° C., in the presence of oxygen though it depends upon the compositions of the respective precursor layers and the respective primary sintered bodies. It is also preferable to perform drying at a lower temperature than that of the firing, prior to execution of the firing. The drying is preferably carried out at 80-250° C. though it depends upon a type or an amount of a solvent contained in each precursor layer.

Next, a metal paste for formation of the anode collector 5 is applied onto the anode 2, a metal paste for formation of the cathode collector 6 is applied onto the cathode 3, and they are dried to form the anode collector 5 and the cathode collector 6. The application of the metal pastes herein can be performed by screen printing, nozzle application, doctor blade application, or the like. The drying is normally carried out at the temperature of 80-250° C. though it depends upon a type or an amount of a solvent contained in each metal paste.

Thereafter, the resultant is sealed except for the portions to be exposed in the current collectors, by a resin mold or the like (not shown) if needed, to obtain the all-solid-state lithium-ion secondary battery 1.

When the all-solid-state lithium-ion secondary battery is produced by the above-described method, the first intermediate layer 20 is formed between the anode 2 and the solid electrolyte layer 4 and the second intermediate layer 30 is formed between the cathode 3 and the solid electrolyte layer 4. This allows us to obtain the all-solid-state lithium-ion secondary battery 1 with drastically improved ion conductivity between the anode 2 and the solid electrolyte layer 4 and between the cathode 3 and the solid electrolyte layer 4 and with excellent high-rate discharge characteristic and excellent cycle characteristic.

The above described the preferred embodiments of the present invention, but it should be noted that the present invention is by no means limited to the above embodiments.

Figure 2:
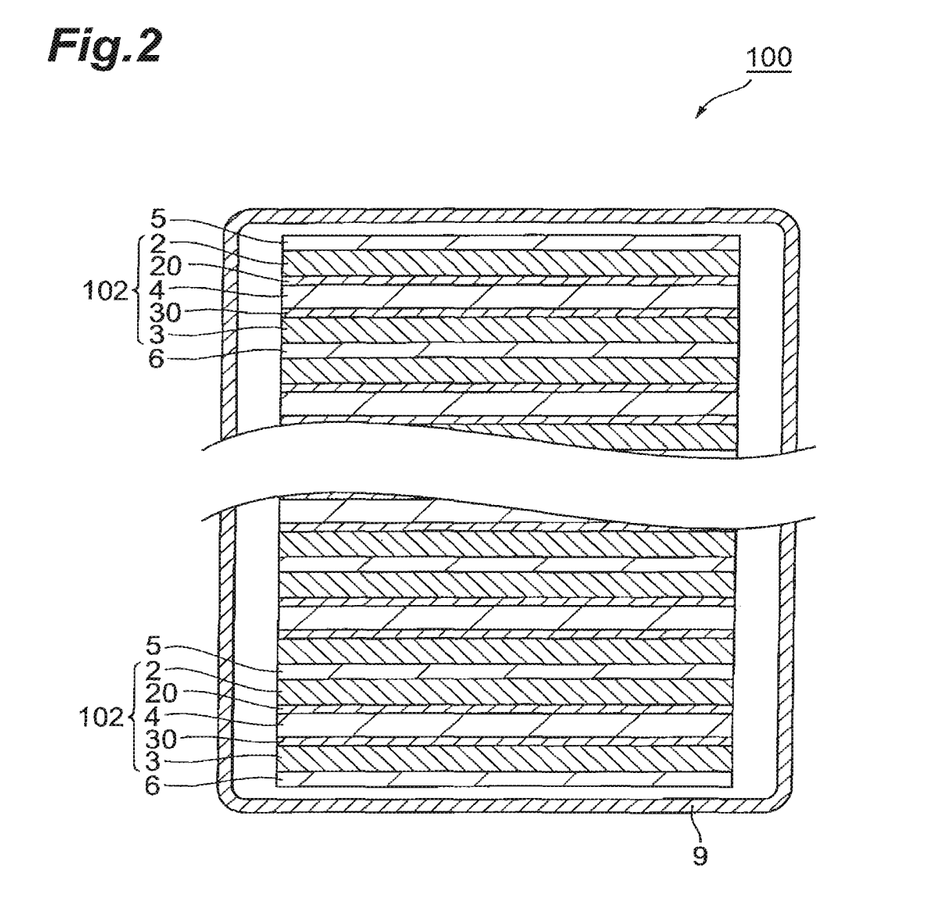
FIG. 2 is a schematic sectional view showing a basic configuration of another embodiment of the all-solid-state lithium-ion secondary battery of the present invention.

For example, the all-solid-state lithium-ion secondary battery of the present invention may have a configuration of a module 100, as shown in FIG. 2, in which a plurality of single cells (each of which is a cell consisting of the anode 2, first intermediate layer 20, solid electrolyte layer 4, second intermediate layer 30, and cathode 3) 102 are stacked through the anode collector 5 and the cathode collector 6 and in which they are held (packaged) in a hermetically closed state in a predetermined case 9. The module may also be constructed without use of the case 9, by sealing it except for the portions to be exposed in the current collectors, by a resin mold or the like.

Furthermore, in the above case, the single cells may be connected in parallel or in series. For example, it is also possible to construct a battery unit in which a plurality of above-described modules 100 are electrically connected in series or in parallel.

Furthermore, in the case of construction of the above-described module or battery unit, a protection circuit or a PTC element similar to those in the existing batteries may be further provided according to need.

The present invention will be described below in more detail on the basis of examples and a comparative example, but it is noted that the present invention is by no means intended to be limited to the examples below.

EXAMPLE 1

Tin chloride and iron nitrate were weighed at Sn:Fe=1:1 (molar ratio) and 5 equivalents of citric acid monohydrate and 20 equivalents of ethylene glycol were added therein relative to the total number of moles of Sn and Fe. The resulting mixture was stirred at 50° C. for five hours to obtain a sol anode precursor.

5.6 equivalents of titanium butoxide, 10 equivalents of ammonium dihydrogenphosphate, and 4.3 equivalents of lithium acetate were mixed in 1 equivalent of aluminum butoxide, and 60 equivalents of butanol were further added therein and stirred to obtain a sol solid electrolyte layer precursor.

1 equivalent of lithium acetate, 20 equivalents of acetic acid, 20 equivalents of water, 20 equivalents of isopropanol, and 1 equivalent of polyvinylpyrrolidone were added in 1 equivalent of cobalt acetate and stirred to obtain a sol cathode precursor.

Each of the sol anode precursor, the sol solid electrolyte layer precursor, and the sol cathode precursor thus obtained was applied onto a PET film, dried, and then peeled off from the PET film. The solid electrolyte layer precursor was fired at 900° C. for three hours, the anode precursor at 700° C. for one hour, and the cathode precursor at 800° C. for three hours. This resulted in obtaining the anode primary sintered body, the solid electrolyte layer primary sintered body, and the cathode primary sintered body.

Next, the sol solid electrolyte layer precursor was applied onto the both sides of the solid electrolyte layer primary sintered body to form coating films thereon. Subsequently the anode primary sintered body was stuck onto one coating film in an undried state and the cathode primary sintered body was stuck onto the other coating film in an undried state. Then they were kept in vacuum to impregnate part of the sol solid electrolyte layer precursor into the anode primary sintered body and into the cathode primary sintered body. The resulting laminate was fired at 900° C. in a nitrogen atmosphere for three hours to obtain a sintered body sheet in which the anode (thickness: 5 μm)/first intermediate layer (thickness: 0.2 μm)/solid electrolyte layer (thickness: 3 μm)/second intermediate layer (thickness: 0.2 μm)/cathode (thickness: 5 μm) were stacked in this order. A Ni paste was applied onto the both sides of this sintered body sheet (i.e., onto the anode and the cathode), and dried to form Ni layers as current collectors. Next, the sintered body sheet with the current collectors was cut in the size of 0.5 cm×0.5 cm to obtain a chip-type electrode laminate. The upper and lower end faces (Ni layers) of the resulting chip-type electrode laminate were plated with nickel to form external output terminals. Thereafter, the peripheral part of the chip-type electrode laminate was sealed except for the external output terminals by a resin mold to fabricate a chip-type all-solid-state lithium-ion secondary battery.

Figure 3:
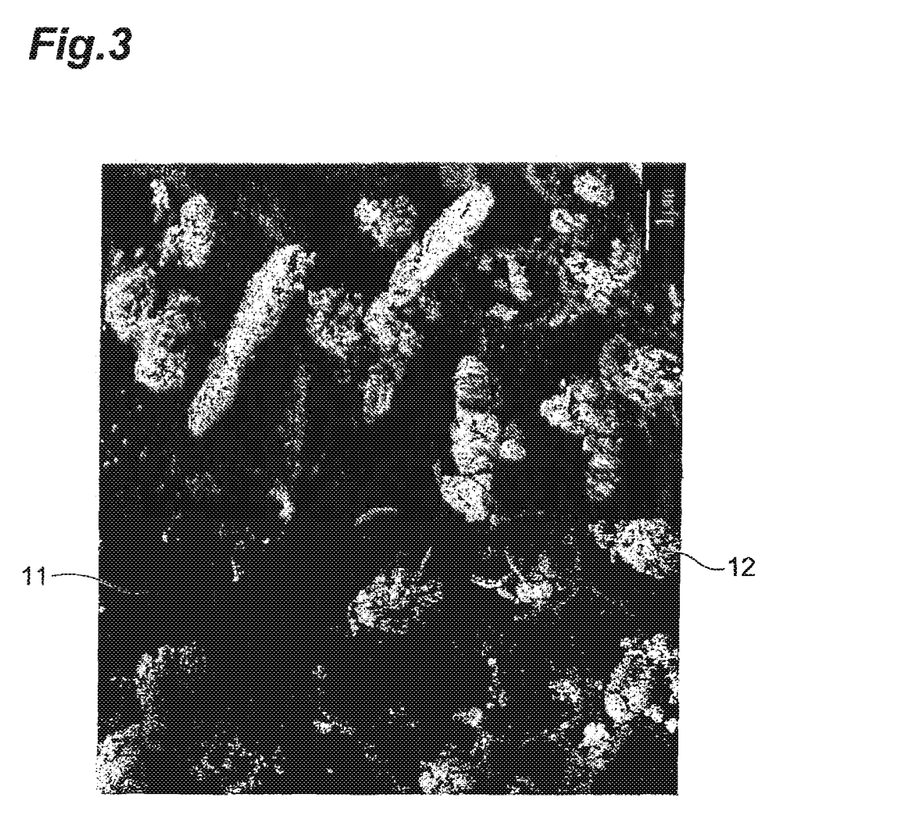
FIG. 3 is a scanning electron microscope photograph (magnification: ×10000) of a cross section of an anode in the all-solid-state lithium-ion secondary battery obtained in Example 1.

FIG. 3 shows a scanning electron microscope photograph (magnification: ×10000) of a cross section of the anode in the resulting all-solid-state lithium-ion secondary battery. As shown in FIG. 3, it was confirmed that the anode was made of a composite material in which metal (FeSn alloy) 12 was supported in pores of a porous carbon material 11.

EXAMPLE 2

A chip-type all-solid-state lithium-ion secondary battery of Example 2 was fabricated in the same manner as in Example 1, except that the sol solid electrolyte layer precursor was applied onto the respective surfaces of the anode primary sintered body and the cathode primary sintered body, instead of the both sides of the solid electrolyte layer primary sintered body, in the step of sticking the anode primary sintered body, the solid electrolyte layer primary sintered body, and the cathode primary sintered body together.

EXAMPLE 3

The sol anode precursor and the sol cathode precursor were prepared in the same manner as in Example 1. The sol solid electrolyte layer precursor in Example 1 was prepared as a sol intermediate layer precursor in the same manner as in Example 1.

45 parts by mass of particles of $Li_{1.3}Al_{0.3}Ti_{1.7}(PO_4)_3$ were mixed with 5 parts by mass of polyvinylpyrrolidone as a thickener and 50 parts by mass of distilled water were further added as a solvent therein to prepare a coating solution for formation of the solid electrolyte layer. $Li_{1.3}Al_{0.3}Ti_{1.7}(PO_4)_3$ used herein was one obtained by mixing $Li_2CO_3$, $Al_2O_3$, $TiO_2$, and $(NH_4)_2HPO_4$ at a stoichiometric ratio, firing the mixture at 900° C., and pulverizing the resultant.

Each of the sol anode precursor, the solid electrolyte layer-forming coating solution, and the sol cathode precursor obtained was applied onto a PET film, dried, and thereafter peeled off from the PET film. Then the solid electrolyte layer precursor was fired at 950° C. for five hours, the anode precursor at 700° C. for one hour, and the cathode precursor at 800° C. for three hours. This resulted in obtaining the anode primary sintered body, the solid electrolyte layer primary sintered body, and the cathode primary sintered body.

Next, the sol intermediate layer precursor was applied onto the both sides of the solid electrolyte layer primary sintered body to form coating films thereon. Subsequently, the anode primary sintered body was stuck onto one coating film in an undried state and the cathode primary sintered body was stuck onto the other coating film in an undried state. Then they were kept in vacuum to impregnate part of the sol intermediate layer precursor into the anode primary sintered body and into the cathode primary sintered body. The resulting laminate was fired at 900° C. for three hours to obtain a sintered body sheet in which the anode (thickness: 5 μm)/first intermediate layer (thickness: 0.2 μm)/solid electrolyte layer (thickness: 3 μm)/second intermediate layer (thickness: 0.2 μm)/cathode (thickness: 5 μm) were stacked in this order. A Ni paste was applied onto the both sides of this sintered body sheet (i.e., onto the anode and the cathode), and dried to form Ni layers as current collectors. Next, the sintered body sheet with the current collectors was cut in the size of 0.5 cm×0.5 cm to obtain a chip-type electrode laminate. The upper and lower end faces (Ni layers) of the resulting chip-type electrode laminate were plated with nickel to form external output terminals. Thereafter the peripheral part of the chip-type electrode laminate was sealed except for the external output terminals by a resin mold to fabricate a chip-type all-solid-state lithium-ion secondary battery.

Comparative Example 1

A chip-type all-solid-state lithium-ion secondary battery of Comparative Example 1 was fabricated in the same manner as in Example 1, except that the application of the sol solid electrolyte layer precursor onto the both sides of the solid electrolyte layer primary sintered body was not carried out in the step of sticking the anode primary sintered body, the solid electrolyte layer primary sintered body, and the cathode primary sintered body together.

<Evaluation of High-Rate Discharge Characteristic>

For each of the all-solid-state lithium-ion secondary batteries obtained in Examples 1-3 and Comparative Example 1, a percentage (%) of 2C capacity was determined relative to 1C capacity as 100%, where 1C was an electric current value to a discharge end in one hour in execution of constant-current discharge at the discharge temperature of 25° C. and the 1C capacity was a discharge capacity achieved at that time. The results are presented in Table 1 below.

<Evaluation of Cycle Characteristic>

With each of the all-solid-state lithium-ion secondary batteries obtained in Examples 1-3 and Comparative Example 1, the battery was charged by 2C-CCCV charge (constant-current constant-voltage charge), then the battery was discharged by 2C-CC discharge (constant-current discharge), and this process as one cycle was repeated by 500 cycles. A capacity retention rate (%) was defined as a percentage of the capacity in the 500th cycle to the capacity in the first cycle, and it was determined for each battery. The results are presented in Table 1 below.

TABLE 1

|  | High-rate discharge characteristic (2C/1C) (%) | Capacity retention rate after 500 cycles (%) |
| --- | --- | --- |
| Example 1 | 76 | 88 |
| Example 2 | 74 | 89 |
| Example 3 | 65 | 79 |
| Comparative Example 1 | 33 | 75 |

What is claimed is:

1. An all-solid-state lithium-ion secondary battery comprising:
an anode;
a cathode;
a solid electrolyte layer disposed between the anode and the cathode; and
at least one of a first intermediate layer disposed between the anode and the solid electrolyte layer, and a second intermediate layer disposed between the cathode and the solid electrolyte layer,
wherein:

at least one of a particle size of the first intermediate layer and a particle size of the second intermediate layer is smaller than those of the anode, the cathode, and the solid electrolyte layer, the anode contains a composite material, the composite material comprises a porous carbon material and at least one material selected from the group consisting of a metal, an alloy of a metal, and an oxide of a metal, the at least one material is supported in a pore of the porous carbon material, and the first and second intermediate layers have a thickness of 0.01 to 10 μm.

2. The all-solid-state lithium-ion secondary battery according to claim 1, wherein the first intermediate layer contains a constituent material of the anode and/or a constituent material of the solid electrolyte layer, and the second intermediate layer contains a constituent material of the cathode and/or a constituent material of the solid electrolyte layer.

3. The all-solid-state lithium-ion secondary battery according to claim 1, wherein the first intermediate layer and/or the second intermediate layer contains a constituent material of the solid electrolyte layer.

4. The all-solid-state lithium-ion secondary battery according to claim 1, which is obtained by a production method of an all-solid-state lithium-ion secondary battery comprising:

a primary sintered body forming step of forming a primary sintered body of anode, a primary sintered body of cathode, and a primary sintered body of solid electrolyte layer;

a laminate forming step of disposing the primary sintered body of solid electrolyte layer between the primary sintered body of anode and the primary sintered body of cathode, and disposing at least one of an undried first precursor layer formed by application of a first sol intermediate layer precursor on a surface of the primary sintered body of anode nearer to the primary sintered body of solid electrolyte layer or on a surface of the primary sintered body of solid electrolyte layer nearer to the primary sintered body of anode, and an undried second precursor layer formed by application of a second sol intermediate layer precursor on a surface of the primary sintered body of cathode nearer to the primary sintered body of solid electrolyte layer or on a surface of the primary sintered body of solid electrolyte layer nearer to the primary sintered body of cathode, thereby forming a laminate; and a firing step of firing the laminate to obtain a sintered body comprising an anode resulting from refiring of the primary sintered body of anode, a cathode resulting from refiring of the primary sintered body of cathode, and a solid electrolyte layer disposed between the anode and the cathode and resulting from refiring of the primary sintered body of solid electrolyte layer, and comprising at least one of a first intermediate layer disposed between the anode and the solid electrolyte layer and resulting from firing of the first precursor layer, and a second intermediate layer disposed between the cathode and the solid electrolyte layer and resulting from firing of the second precursor layer.

5. The all-solid-state lithium-ion secondary battery according to claim 1, wherein the metal is at least one metal selected from the group consisting of Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V, and Zn.

6. The all-solid-state lithium-ion secondary battery according to claim 1, wherein the composite material comprises the porous carbon material and an alloy of FeSn supported in the pore of the porous material.

7. The all-solid-state lithium-ion secondary battery according to claim 1, wherein an average pore size of the porous carbon material is not more than 5 nm.

8. The all-solid-state lithium-ion secondary battery according to claim 1, wherein an average primary particle size of the at least one material is not less than 10 nm nor more than 500 nm.

9. The all-solid-state lithium-ion secondary battery according to claim 1, wherein the battery has a high-rate discharge characteristic of at least 65%.

10. The all-solid-state lithium-ion secondary battery according to claim 1, wherein the battery has a capacity retention rate after 500 cycles of at least 79%.

* * * * *